J. R. MOFFATT.
OVERSEAMING MACHINE.
APPLICATION FILED OCT. 28, 1913.

1,275,287.

Patented Aug. 13, 1918.
8 SHEETS—SHEET 8.

Witnesses

Inventor
James R. Moffatt
By Sturtevant Mason
Attorneys

UNITED STATES PATENT OFFICE.

JAMES R. MOFFATT, OF CHICAGO, ILLINOIS, ASSIGNOR TO UNION SPECIAL MACHINE COMPANY, OF CHICAGO, ILLINOIS, A CORPORATION OF ILLINOIS.

OVERSEAMING-MACHINE.

1,275,287.

Specification of Letters Patent.   Patented Aug. 13, 1918.

Application filed October 28, 1913.   Serial No. 797,778.

*To all whom it may concern:*

Be it known that I, JAMES R. MOFFATT, a citizen of the United States, residing at Chicago, in the county of Cook, State of Illinois, have invented certain new and useful Improvements in Overseaming - Machines, of which the following is a description, reference being had to the accompanying drawing and to the figures of reference marked thereon.

The invention relates to new and useful improvements in sewing machines, and more particularly to an overseaming machine for forming stitches about the edges of fabrics which are supported and fed through the machine in substantially a vertical plane.

In this type of machine the needle is caused to enter the fabric in substantially a horizontal plane, and a looper enters the needle loop on one side of the fabric, and is then raised and carried over the edge of the fabric to the other side thereof. The looper thread loop is positioned for the entrance of the needle on its next stroke.

An object of the invention is to provide means for supporting the looper so that it may be moved rapidly through these various movements with little or no vibration or deviation from its proper path.

A further object of the invention is to provide means for supporting the needle bar in the above type of machine so that it may be positively reciprocated with little or no lateral vibration.

These and other objects will in part be obvious and will in part be hereinafter more fully described.

In the drawings, which show by way of illustration one embodiment of the invention, Figure 1 is a vertical sectional view through a machine having my improvements applied thereto, showing some of the supporting parts in section and the operating parts in the main in side elevation;

Figure 1:
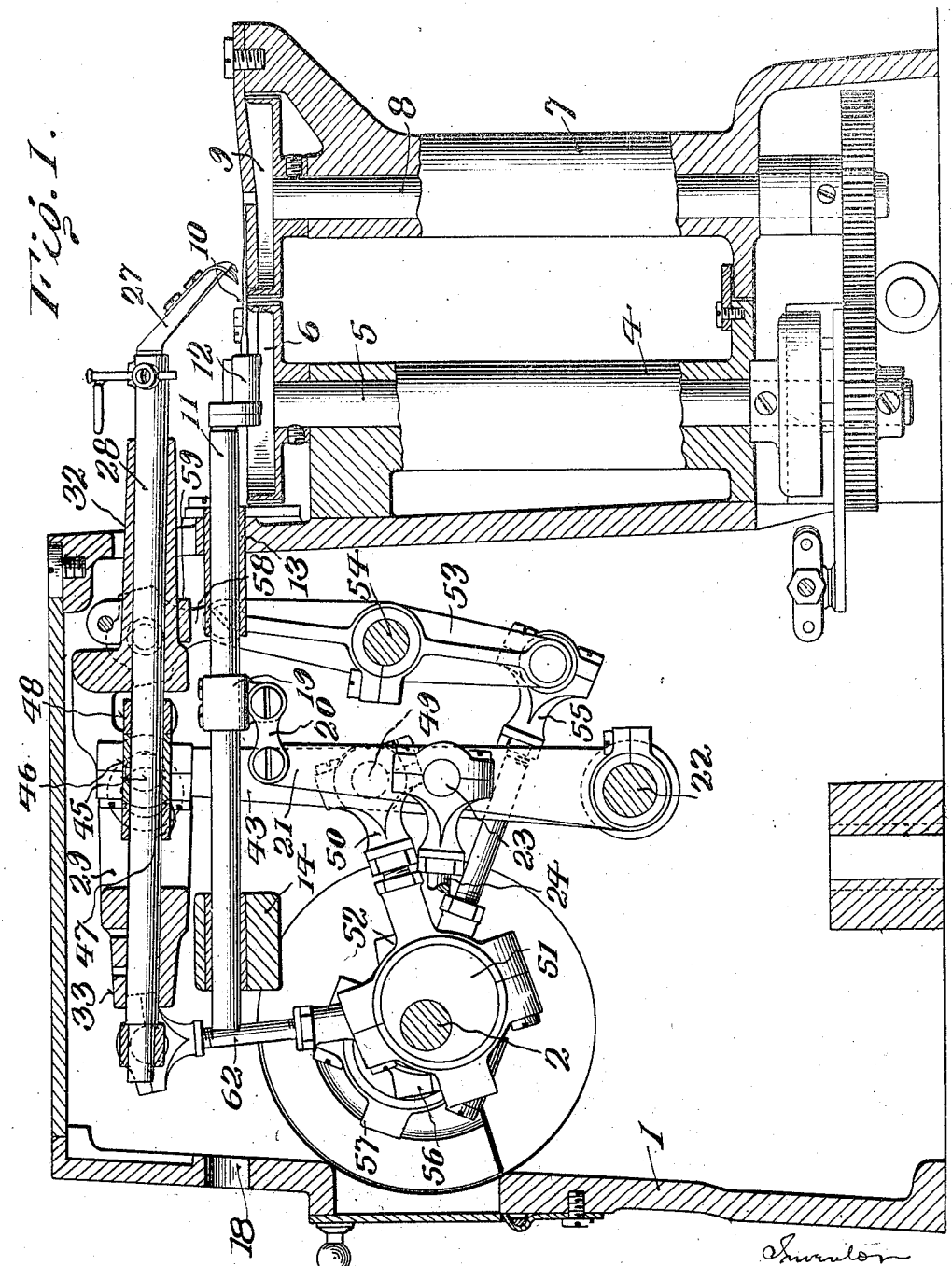
Figure 2:
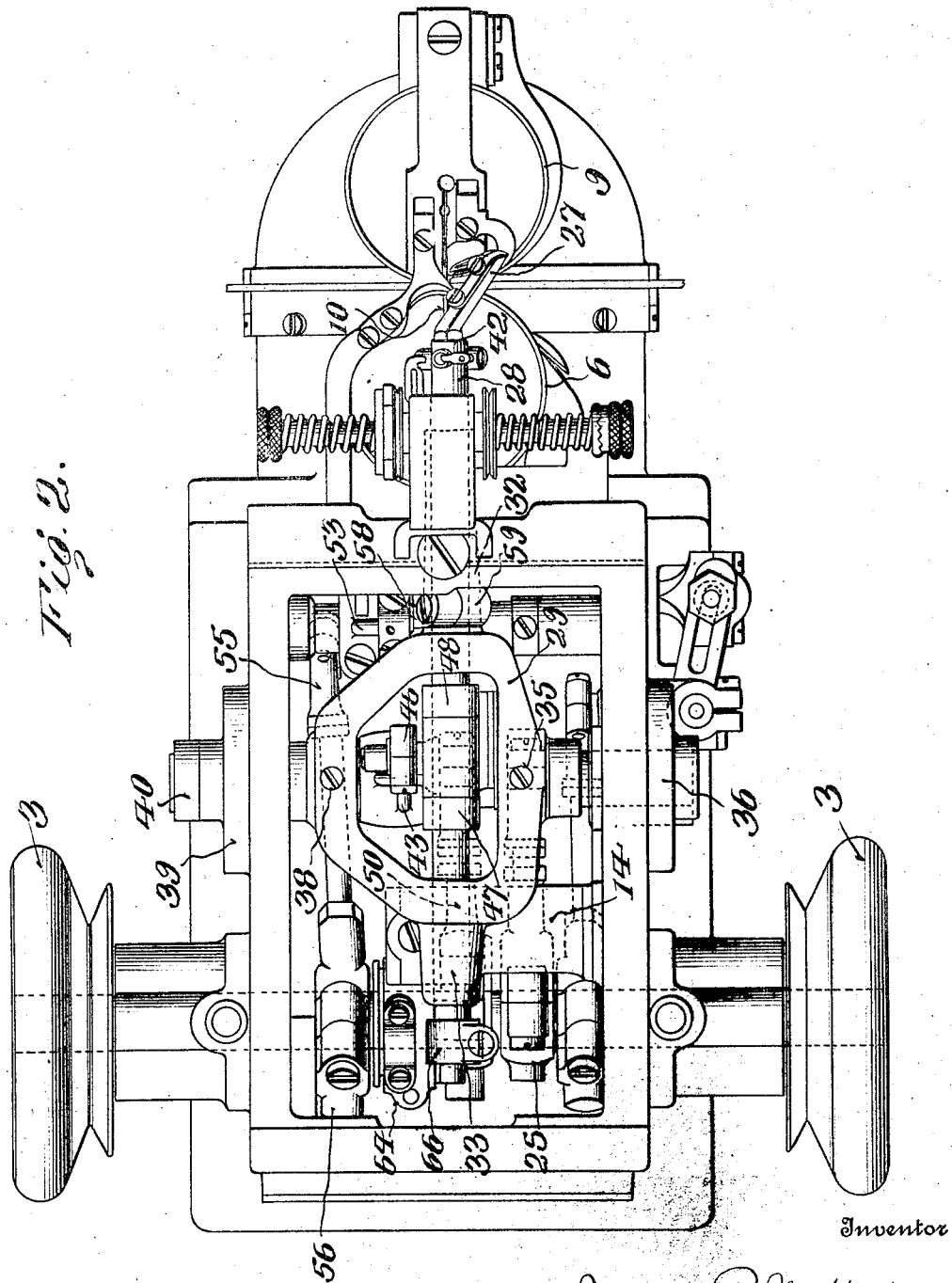
Fig. 2 is a plan view of a machine embodying my improvements, the top plate being removed.

My improved machine consists of a main casing 1, in which is mounted a main shaft 2. This main shaft carries belt wheels 3 at the outer ends thereof. Mounted in the casing 1 is a bracket 4, in which is journaled a feed shaft 5, carrying a feed wheel 6. A bracket 7 is pivoted to the bracket 4, and a feed shaft 8 mounted on this pivoted bracket carries a feed wheel 9. These feed wheels may be operated by any suitable mechanism from the main shaft, which will impart to the feed wheels an intermittent rotary movement. The outer feed wheel is yieldably pressed into contact with the inner feed wheel and the fabric to be stitched is supported and fed through the machine in substantially a vertical plane by these feed wheels. The fabric projects slightly above the feed wheels so that the needle 10 may pass through the same adjacent its upper edges. This needle 10 is clamped to a needle bar 11, by a needle supporting head 12. The needle bar 11 reciprocates in a sleeve 13 which is mounted in the main casing 1, and extends a considerable distance into the casing, so as to form an elongated supporting bearing for the needle bar.

Figure 3:
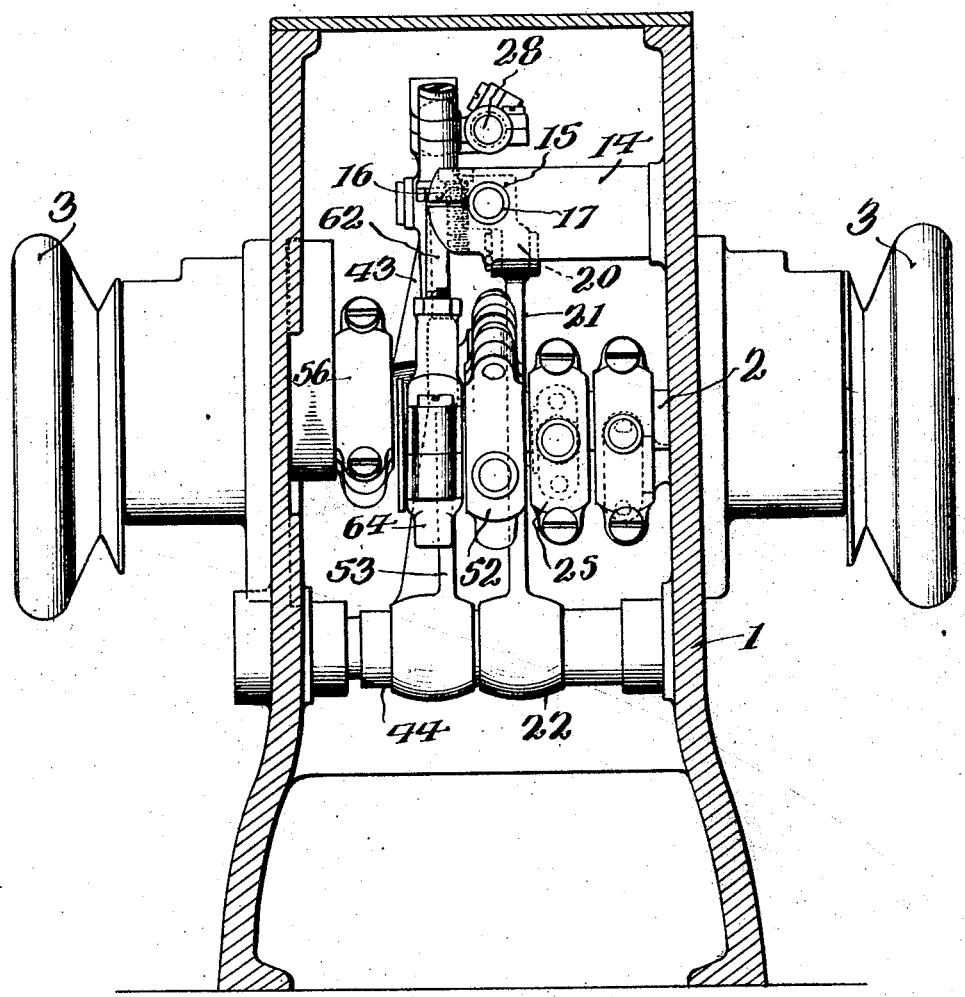
Fig. 3 is a vertical sectional view in rear of the main shaft and the operating parts.

The casing 1 is also provided with a projecting lug 14, which is preferably formed integral with the casing. This lug is bored out as at 15 and is also split as at 16. See Fig. 3. A bearing sleeve 17 is inserted in the opening 15 and this sleeve is clamped therein by a suitable bolt passing through the split ends of the lug. The back wall of the casing is provided with an opening 18, which permits the boring-out of the lug 14, and preparing the same for the bearing sleeve.

Mounted on the needle bar between its bearings is a fixed collar 19. A link 20 is pivoted to a projecting lug carried by this collar, and the other end of the link is pivoted to a lever 21, which is fixed to a shaft 22 mounted in suitable bearings in the main casing 1. This lever 21, between its ends, carries a ball stud 23. A link 24 engages said ball stud and is formed integral with an eccentric strap 25, coöperating with an eccentric 26 on the main shaft 2.

As the main shaft rotates, the lever 21 will be vibrated back and forth and this lever will, in turn, reciprocate the needle bar in its bearings. By forming a lug on the inside wall of the casing, and at some distance from the rear end of the casing, I am able to use a comparatively short needle bar, and support said needle bar in elongated bearings between which the fixed collar 19 reciprocates. By bringing these bearings 13 and 14 close together, and elongating the same, I may reciprocate the needle bar at high speed with little or no resulting lateral or false vibrations in the needle bar.

Coöperating with the needle is a looper 27. This looper is fixed to a looper supporting rod 28. The looper moves into the needle loop at one side of the plane of the fabric, after which it is raised and carried to the other side of the fabric and lowered so that the needle will pass between the looper thread and the body of the looper.

Figure 8:
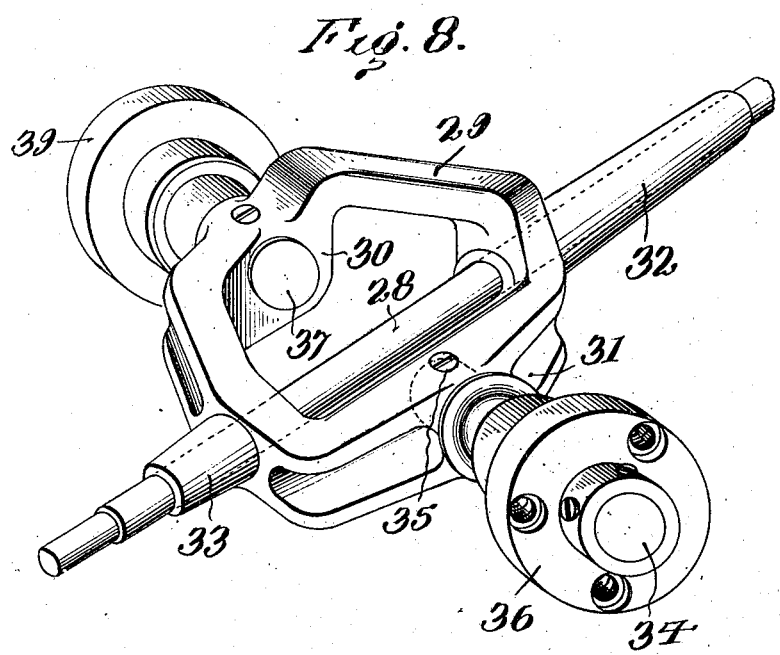
Fig. 8 is a perspective view showing the looper rod carrier and its supporting bearings, and also the looper rod.
Figure 9:
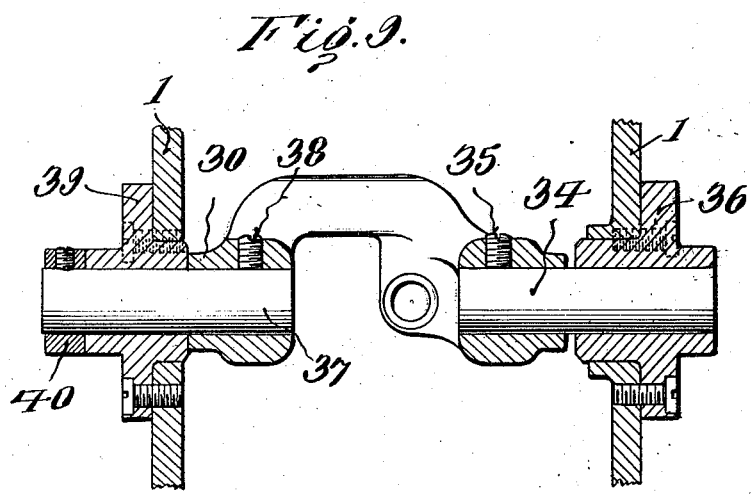
Fig. 9 is a vertical sectional view through the looper carrier, the supporting bearings and the parts of the casing adjacent the same.

The present invention is directed especially to a high speed machine, and the means for supporting the looper rod, which permits of the high speed without false vibrations in the looper rod, which would cause the looper to deviate from its proper path of travel. The looper rod is supported by a carrier 29. This carrier, as more clearly shown in Fig. 8, is, in a sense, in the form of a double yoke. Said carrier has oppositely disposed bearing sleeves 30 and 31. Arms project laterally from these bearing sleeves and are connected with each other, thus forming the double yoke. Projecting forwardly from the carrier is a sleeve 32 and projecting rearwardly from the carrier is a sleeve 33. The looper supporting rod 28 rests in these sleeves 32 and 33 and is capable of endwise reciprocation therein and also oscillation therein.

The sleeve 31 of this looper carrier 29 is provided with a short shaft 34, which is fixed therein by a set screw 35. This short shaft projects into a bearing 36, which is bolted to the side wall of the main casing 1. The sleeve 30 at the other side of the carrier is provided with a short shaft 37, which is fixed therein by a set screw 38. This short shaft 37 extends through a bearing 39 which is bolted to the other side wall of the main casing 1. Said shaft 37 extends through the bearing and a sleeve 40 fixed thereon prevents the shaft from endwise movement in one direction in the bearing 39. The sleeve 30 is faced at its end and bears against the inner wall of the bearing 39 and prevents endwise movement of the shaft 37 in the other direction.

The main casing 1 is provided with an opening 41 through which the bearing sleeve 32 of the carrier projects. Said bearing sleeve terminates just short of the position of the looper head 42 at the end of the looper supporting rod, when said looper supporting rod is at the rear end of its stroke. I am thereby able, through this extended sleeve bearing, to form a rigid support for the looper rod at a point well over the feed wheel and to substantially the inner end of the stroke of the looper rod.

Figure 4:
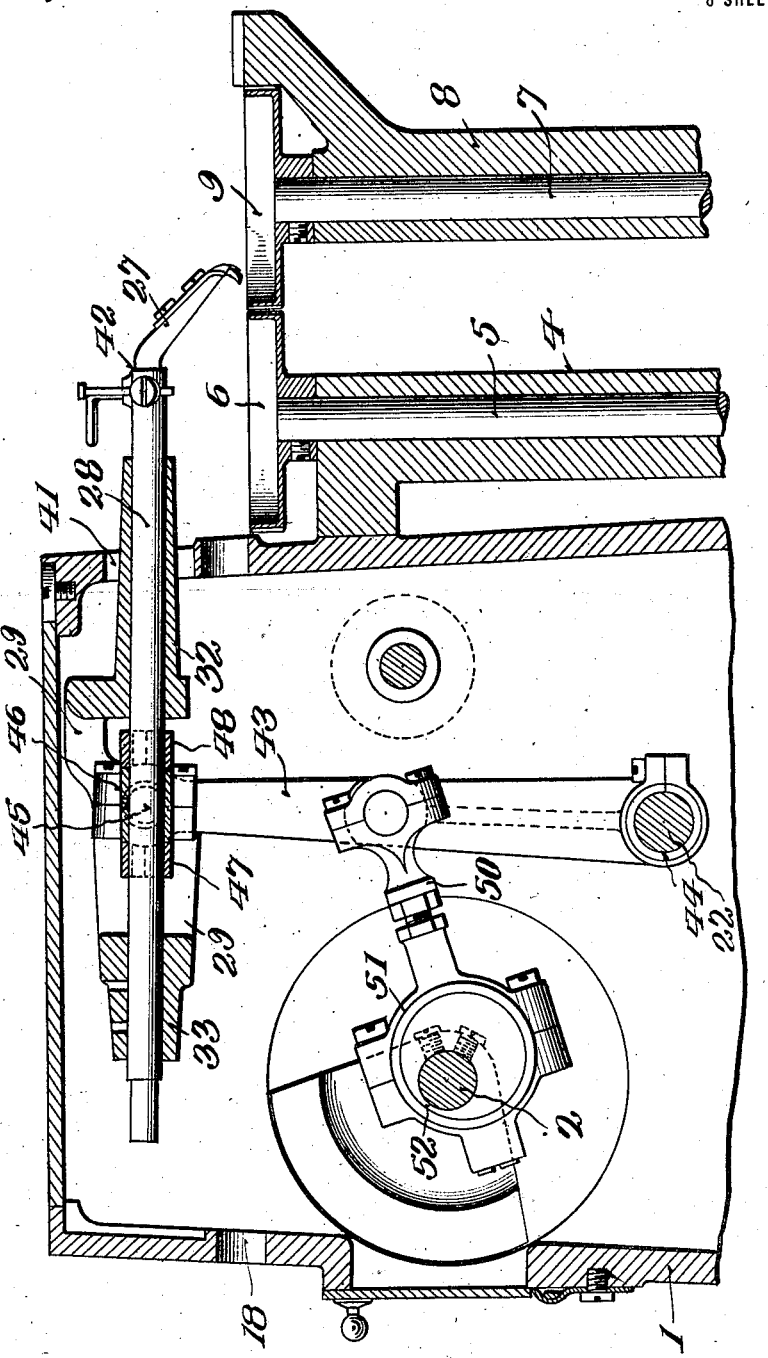
Fig. 4 is a vertical sectional view showing the carrier for the looper rod and the means for reciprocating the rod in its carrier.

The bearing sleeve 33 also projects outwardly from the carrier 29 and forms an extended bearing for the looper supporting rod. The looper supporting rod is reciprocated back and forth in the carrier to bring the looper from one side of the fabric to the other by a lever 43. See Fig. 4. This lever at its lower end is loosely journaled on the shaft 22 and is held from sidewise movement thereon by a collar 44. The lever at its upper end is connected to a ball stud 45, which is carried by a collar 46 loosely mounted on the looper rod support 28. Fixed collars 47 and 48 at each side of the sleeve prevent the sleeve from moving endwise on the looper supporting rod. Intermediate the ends of the lever 43 is a ball stud 49, to which a link 50 is pivoted. This link 50 is a part of an eccentric strap 51, which coöperates with the eccentric 52 on the main shaft 2.

Figure 5:
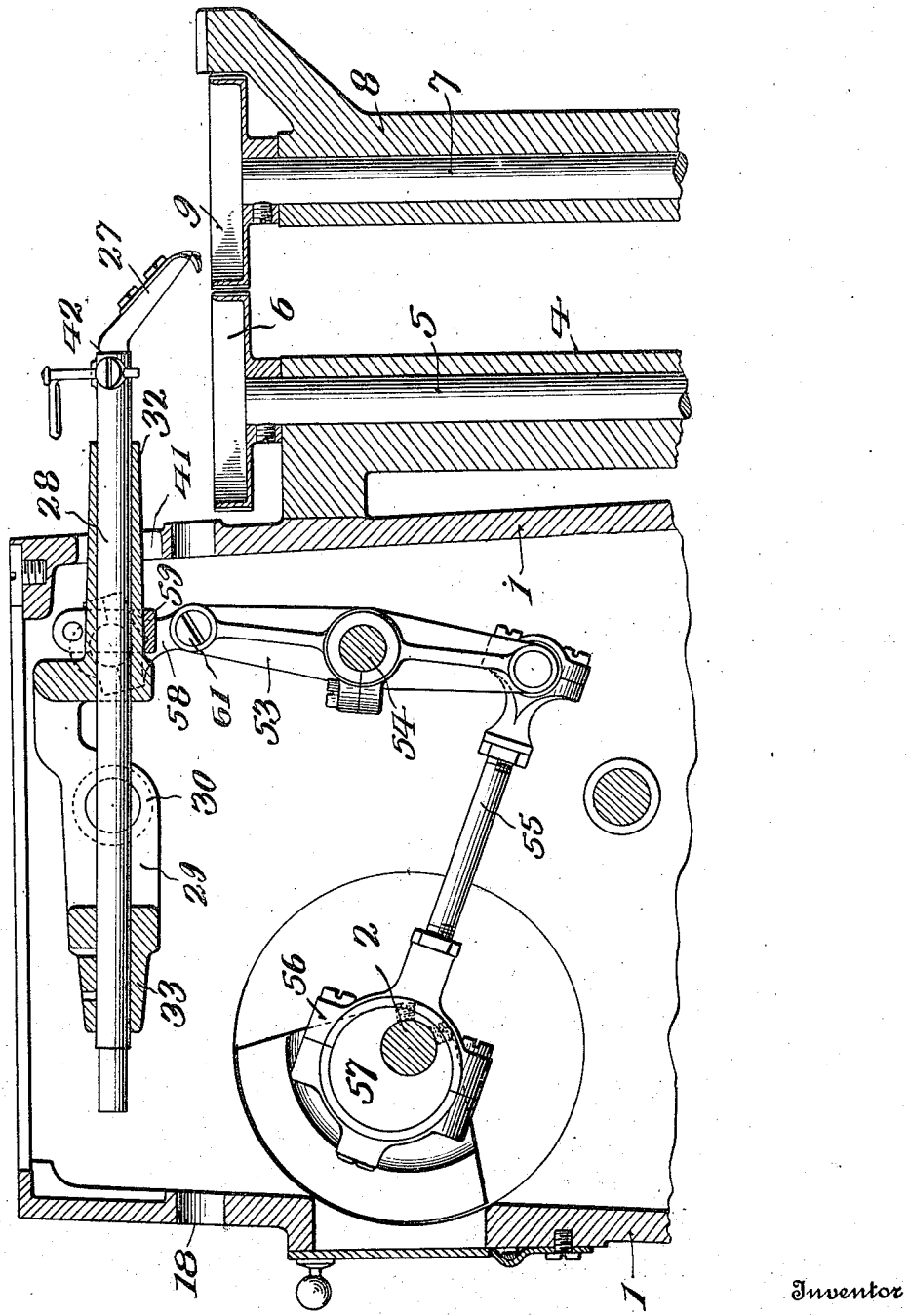
Fig. 5 is a similar view showing the means for oscillating the carrier.

As the main shaft rotates, the lever 43 will be moved back and forth, and this will reciprocate the looper rod in the carrier. The carrier is oscillated about its pivotal support by a lever 53. See Fig. 5. This lever 53 is pivoted at 54 intermediate its ends to a supporting shaft. The lower end of the lever is pivotally connected to a link 55, which is formed integral with the eccentric strap 56, coöperating with the eccentric 57 on the main shaft 2. The upper end of the lever 53 is pivoted to a link 58, and this link, in turn, is pivoted to a sleeve 59, fixed to the carrier. The upper part of the lever 53 and the link 58 are so disposed that the pivotal connection 61 between the same moves first to one side and then the other of a line passing through the axis of the lever 53 and the pivotal connection of the link 58 to the sleeve 59.

By this arrangement of the parts, the carrier will be oscillated twice for each single rotation of the main shaft. This swinging of the carrier raises and lowers the looper. The looper is lowered on one side of the fabric, after which it is raised and carried to the other side of the fabric, where it is again lowered for the needle to pass between the thread and the body of the looper. It is, therefore, raised and lowered twice for each reciprocation of the needle.

Figure 6:
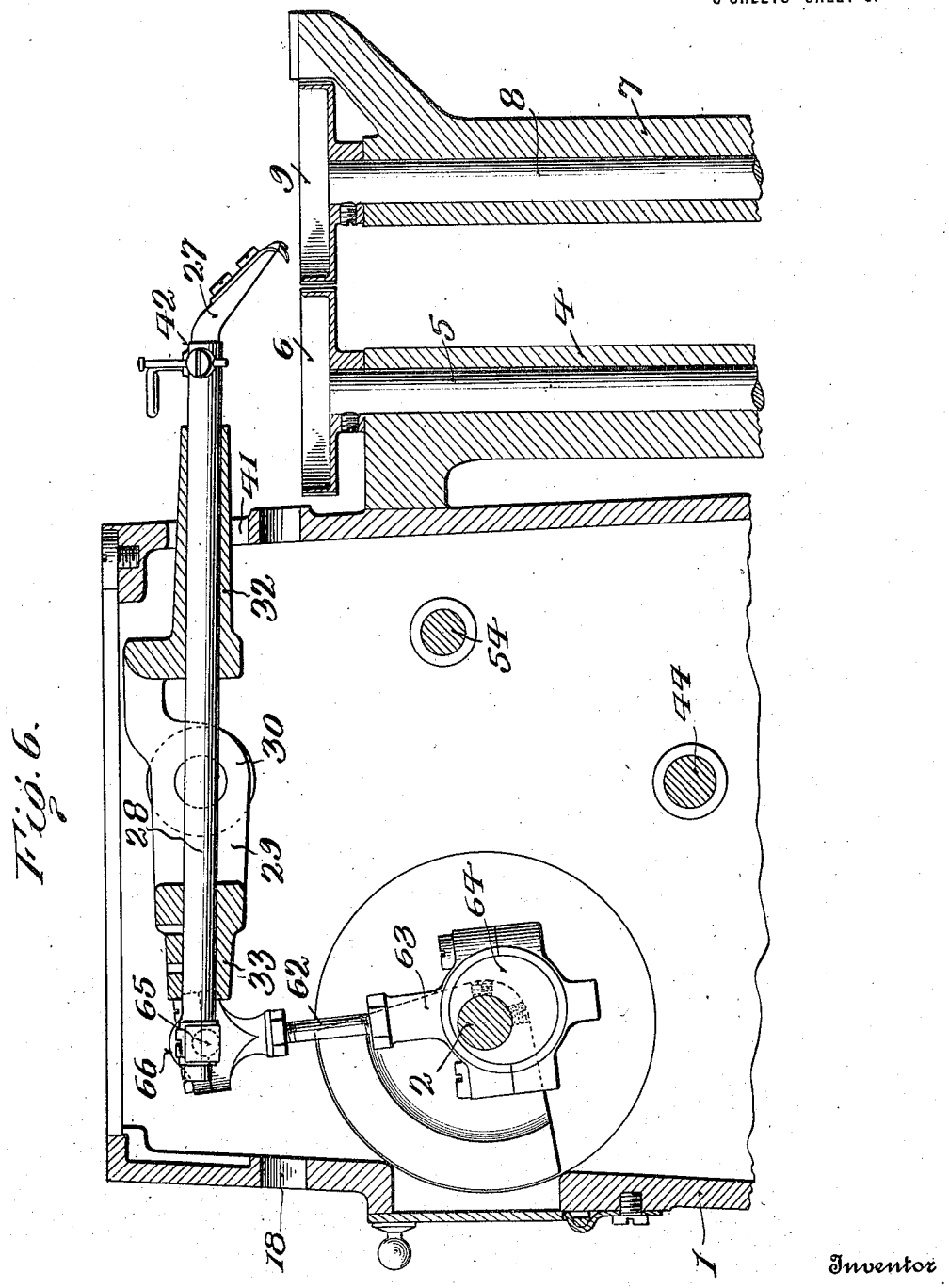
Fig. 6 is a similar view showing the means for oscillating the looper rod in its carrier.
Figure 7:
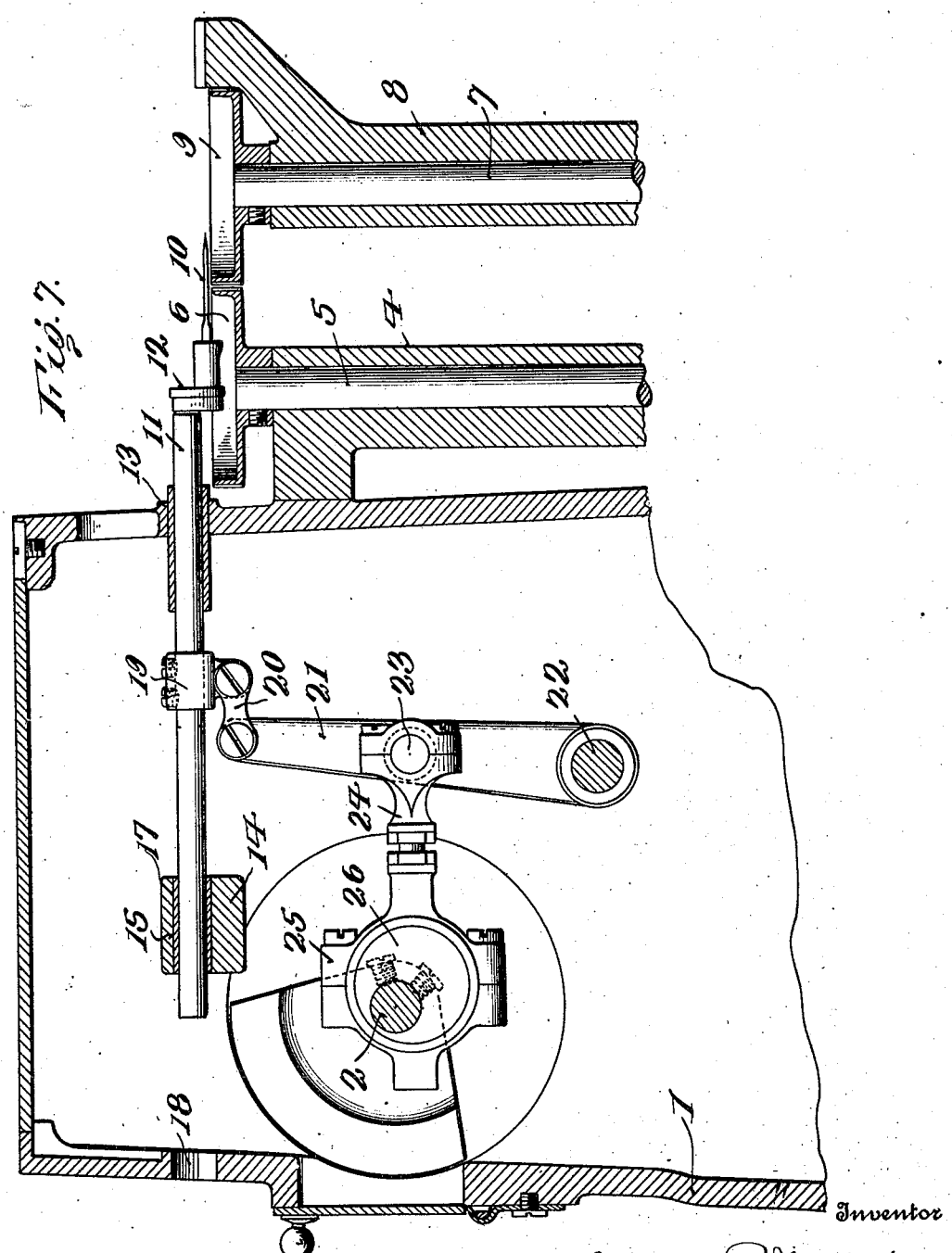
Fig. 7 is a view showing the manner of supporting the needle bar and the reciprocating devices therefor.

The looper is moved into and out of the needle loop by a link 62. See Fig. 6. This link, as herein shown, is formed integral with an eccentric strap 63, which coöperates with an eccentric 64 on the main shaft 2. The upper end of the link is connected to a ball stud 65, which projects laterally to form a collar 66, fixed to the extreme inner end of the looper supporting rod 28. As the main shaft rotates, the link 62 will be raised and lowered, and this will, in turn, oscillate the looper supporting rod 28. The oscillations of the looper rod move the looper into and out of the needle loop.

The above described devices are so timed in their operations that the looper is moved into the needle loop, then raised and carried across the edge of the fabric, then depressed or lowered and given a dwell, while the needle moves between the looper thread and the body of the looper, after which the looper is retracted from the needle loop, again raised, carried across the edge of the fabric, and lowered into position for again moving into the next needle loop.

The particular devices for oscillating the looper carrier and for reciprocating and oscillating the looper supporting rod in the carrier, form no part of my invention, and it will be understood that other devices may be used for this purpose.

It is obvious that minor changes in the details of construction and the arrangement of parts may be made without departing from the spirit of the invention, as set forth in the appended claims.

Having thus described my invention, what I claim is:

1. A sewing machine including in combination, a casing, devices for supporting a fabric in substantially a vertical plane, a horizontal reciprocating needle, a looper coöperating with said needle, a looper supporting rod for said looper, a carrier for said looper supporting rod, means for supporting said carrier at each side of the casing, devices for reciprocating said looper rod in said carrier, said carrier having a bearing sleeve at each side of the connection of the looper supporting rod to its reciprocating means, devices for oscillating said carrier about an axis at right angles to a vertical plane containing the axis of the looper supporting rod, and devices for oscillating the looper supporting rod in said carrier.

2. A sewing machine including in combination, a casing, devices for supporting a fabric in substantially a vertical plane, a horizontal reciprocating needle, a looper coöperating with said needle, a looper supporting rod for said looper, a carrier for said looper supporting rod, said carrier being in the form of a double yoke and having bearing sleeves projecting forwardly and rearwardly therefrom for said looper supporting rod, means for oscillating said double yoke, and devices for reciprocating and oscillating the looper supporting rod in said yoke.

3. A sewing machine including in combination, a casing, devices for supporting a fabric in substantially a vertical plane, a horizontal reciprocating needle, a looper coöperating with said needle, a looper supporting rod for said looper, a carrier for said looper supporting rod, said carrier being in the form of a double yoke and having bearing sleeves projecting forwardly and rearwardly therefrom for said looper supporting rod, means for oscillating said double yoke, and devices for reciprocating and oscillating the looper supporting rod in said yoke, said casing having a slot in the front wall thereof through which the sleeve at the front side of the carrier extends so that said looper rod is supported at a point adjacent the looper supporting head.

4. A sewing machine including in combination a casing, feeding devices for supporting and feeding a fabric in substantially a vertical plane, a needle, a needle bar supporting said needle, a looper, a looper supporting bar, a yoke for supporting the looper bar having the central part thereof open, means attached to said bar in said central open part of the yoke for reciprocating the same, means for oscillating the yoke about a horizontal axis at right angles to a vertical plane containing the axis of the looper supporting bar, and means for oscillating the looper bar.

5. A sewing machine including in combination a casing, feeding devices for supporting and feeding a fabric in substantially a vertical plane, a needle, a needle bar supporting said needle, a looper, a looper supporting bar, a yoke for supporting the looper bar having the central part thereof open, means attached to said bar in said central open part of the yoke for recpirocating the same, means for oscillating the yoke about a horizontal axis at right angles to a vertical plane containing the axis of the looper supporting bar, and means for oscillating the looper bar, one member of said yoke being off-set to form a clearance space for the looper reciprocating means.

6. A sewing machine including in combination a casing, feeding devices for supporting and feeding a fabric in substantially a vertical plane, a needle, a needle bar supporting said needle, a looper, a looper supporting bar, a supporting yoke for said looper supporting bar, means for reciprocating said bar in the yoke, means for oscillating said bar in said yoke, and means for pivotally supporting said yoke, the axes of said yoke lying substantially in the same plane as the axis of said bar and at right angles thereto, and means for oscillating said yoke.

7. A sewing machine including in combination a casing, feeding devices for supporting and feeding a fabric in substantially a vertical plane, a needle, a needle bar supporting said needle, a looper, a looper supporting bar, a yoke for supporting said looper supporting bar, means for pivotally supporting said yoke whereby said yoke swings about an axis at right angles to a vertical plane containing the axis of a looper supporting bar, means attached to said yoke in front of its pivotal support for oscillating the same, means for oscillating said bar in said yoke, and means for reciprocating said bar in said yoke.

In testimony whereof, I affix my signature in the presence of two witnesses.

JAMES R. MOFFATT.

Witnesses:
  A. B. CLOTHIER,
  A. C. ABEL.